(12) United States Patent
Heft

(10) Patent No.: US 11,660,910 B2
(45) Date of Patent: May 30, 2023

(54) REINFORCED TRAILER AXLE TUBE WITH REPLACEABLE SPINDLE ASSEMBLY

(71) Applicant: Jason D Heft, Wells, ME (US)

(72) Inventor: Jason D Heft, Wells, ME (US)

(*) Notice: Subject to any disclaimer, the term of this patent is extended or adjusted under 35 U.S.C. 154(b) by 360 days.

(21) Appl. No.: 17/107,849

(22) Filed: Nov. 30, 2020

(65) Prior Publication Data
US 2021/0213780 A1 Jul. 15, 2021

Related U.S. Application Data

(63) Continuation-in-part of application No. 16/743,782, filed on Jan. 15, 2020, now Pat. No. 10,850,562.

(51) Int. Cl.
*B60B 35/16* (2006.01)

(52) U.S. Cl.
CPC .......... *B60B 35/166* (2013.01); *B60B 35/163* (2013.01)

(58) Field of Classification Search
CPC .............................. B60B 35/163; B60B 35/166
See application file for complete search history.

(56) References Cited

U.S. PATENT DOCUMENTS

| | | | | |
|---|---|---|---|---|
| 1,403,500 A * | 1/1922 | Huff | ....................... | B60B 35/166 219/127 |
| 1,446,502 A * | 2/1923 | Harper | .................. | B60B 35/166 74/607 |
| 2,069,911 A * | 2/1937 | Bourdon | .................... | C23C 8/66 301/124.1 |
| 2,478,180 A * | 8/1949 | Buckendale | .......... | B60B 35/166 74/607 |
| 3,254,901 A * | 6/1966 | Fisher | ..................... | B62D 13/02 280/676 |
| 4,768,839 A * | 9/1988 | Spindler | ............... | B23K 20/129 301/124.1 |
| 6,024,418 A * | 2/2000 | Ebert | ...................... | B23K 31/02 29/402.13 |
| 10,850,562 B1 * | 12/2020 | Heft | ....................... | B60B 35/163 |
| 2011/0204589 A1 * | 8/2011 | Reiter | ................... | B60G 11/113 280/124.11 |
| 2018/0354302 A1 * | 12/2018 | Gratzl | .................... | B60B 35/006 |

* cited by examiner

*Primary Examiner* — Scott A Browne
(74) *Attorney, Agent, or Firm* — Cynthia S. Lamon; Lamon Patent Services

(57) ABSTRACT

An axle tube assembly includes an axle tube, a first tube reinforcement apparatus disposed in the axle tube at one end and a second identical tube reinforcement apparatus disposed into the axle tube at the second end the reinforcement apparatuses welded in place to the axle tube, a first spindle assembly coupled to the first tube reinforcement apparatus, a second spindle assembly coupled to the second tube reinforcement apparatus, and an elongated connector rod or tube connected to the first and second reinforcement apparatuses inside the axle tube and disposed between the reinforcement apparatuses the first and second spindle assemblies having spindle bodies welded to the cylindrical ends of the axle tube.

14 Claims, 8 Drawing Sheets

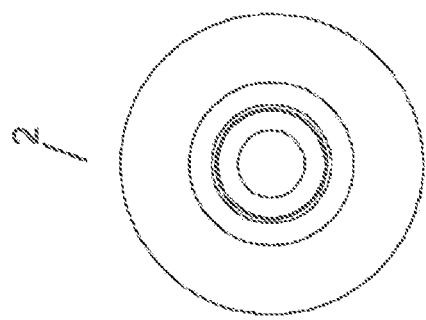
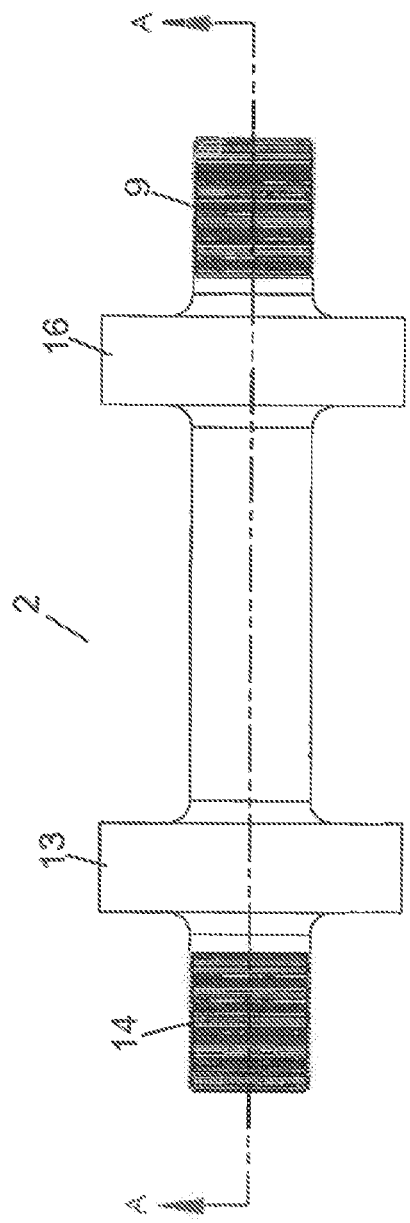
FIG. 5
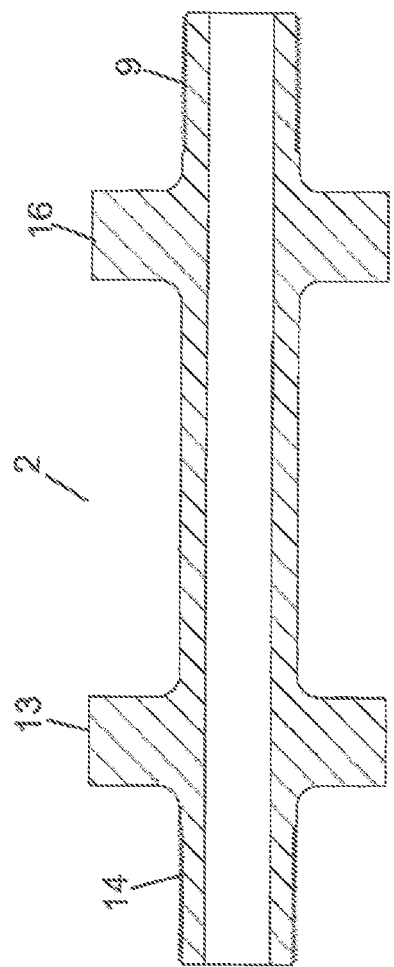
FIG. 7
FIG. 6

REINFORCED TRAILER AXLE TUBE WITH REPLACEABLE SPINDLE ASSEMBLY

BACKGROUND OF THE INVENTION

1. Field of the Invention

The present invention is in the field of commercial drive components, more particularly, trailer axle and spindle components and pertains particularly to methods and apparatus for increasing the structural integrity of an axle tube in relation to a readily replaceable spindle.

2. Discussion of the State of the Art

Trailer axles are subject a large amount of physical wear relative to normal use. Wear on the axle and spindle components of a trailer drive axle may be caused by frequent heavy loads in the trailer, trailer loads that are not balanced properly, and poor road conditions, which may exasperate the wear from heavy or imbalanced loads. Trailer axles need routine maintenance to maintain structural integrity. However, many operators may overlook routine maintenance procedures contributing to earlier failure of the axle and spindle assembly.

Neglect of trailer axles maintenance may pose a threat to the safety of trailer operators and other vehicle operators and the general public due to accidents. Trailer Axle tubes may often exhibit material stress or brittleness of material proximal to the area of the spindle. Currently there are no practiced methods for reinforcing the axle itself or provide for a fail-safe mechanism to reduce likelihood of a roadway accident in the event of a broken spindle.

While there are current methods for replacing a spindle on a trailer axle, these methods are somewhat archaic and often require additional repair time and do not reduce the likelihood off a necessary complete replacement of the damaged trailer axle in the near future. A common method of removing a trailer axle spindle for replacement or repair is to manually grind the existing weld (s) between the trailer axle tube and the spindle components. After separating the two components, it is common practice to apply heat to the collar of the spindle causing it to expand. The spindle may then be urged over the existing axle tube and left to cool. After the heated spindle collar has air cooled and the collar diameter regains original size it can be welded at the proper location on the tube. This repair process results in repair to the axle/spindle but only for a limited time.

One drawback with the method cited immediately above is that it does not provide for any reinforcement of the trailer axle housing. The spindle is thick and sturdy while the axle tube is relatively thin-walled and is susceptible to cracking and even buckling. A cracked or buckled tube may not be salvageable, and the axle is scrapped or taken out of service. The method cited is meant as a temporary fix and does not provide any protection from a potential structural failure including potential loss of the wheel. The currently practiced method also does not allow for a subsequent repair without having to scrap and replace the axle.

Therefore, what is clearly needed is a trailer axle and spindle design and method of application that adds reinforcement to the trailer axle tube, at least in the area of the spindle location, and simplifies subsequent removal and replacement of new or repaired spindles relative to the attachment thereof to the axle component.

BRIEF SUMMARY OF THE INVENTION

An axle tube assembly is provided in this embodiment, comprising an axle tube having a first open end and a second open end, a first cylindrical tube reinforcement apparatus inserted into the axle tube from the first or second end and welded in place to the axle tube, the reinforcement apparatus including at least two cylindrical collar features oriented concentrically to the axle tube. In this embodiment, the collar features have a uniform outside diameter just smaller than the inside diameter of the axle tube to allow frictional contact between the reinforcement apparatus outside surface and the axle tube inside surface.

A second cylindrical tube reinforcement apparatus may be inserted into the axle tube, in this embodiment, from the remaining end of the axle tube and welded in place to the axle tube, the second reinforcement apparatus identical to the first reinforcement apparatus. A first spindle assembly may be removably coupled to the first tube reinforcement apparatus through the first end of the axle tube assembly and a second spindle assembly removably coupled to the second tube reinforcement apparatus through the remaining end of the axle tube assembly. An elongated connector rod or tube may be connected to the first and second reinforcement apparatuses inside the axle tube and disposed between the reinforcement apparatuses. With these components connected, the first and second spindle assemblies may have spindle bodies welded to the cylindrical ends of the axle tube.

One embodiment provides that the coupling of the spindle assemblies to the tube reinforcement apparatuses are by threaded connections mating external to internal threads between the tube reinforcement apparatus and the spindle assembly body, respectively. Another embodiment provides that the tube reinforcement apparatuses are permanently welded to the axle tube at six weld points each, three of the weld points centered over one of the collar features, and three of the weld point centered over another of the collar features, the weld points spaced 120 degrees apart radially, both sets of weld points aligned radially at zero, one hundred and twenty, and two hundred and forty degrees.

One embodiment provides a longitudinal bore placed through the tube reinforcement apparatus, the bore breaking out at both ends of the tube reinforcement apparatus. In this embodiment, the tube reinforcement apparatus may have at least one cylindrical end that provides a seat for the external thread pattern that mates with an internal thread pattern on the spindle assembly body. Additionally, the body of the spindle assembly has a cylindrical end that provides a seat for the internal thread pattern. In one embodiment, the weld joining the spindle assembly body to the axle tube edge may be a continuous weld applied radially and within a welding gap afforded by beveling the edges of the axle tube and the spindle assembly body to form an angularly opposed welding gap exposed to the outside surfaces of the parts.

An alternative embodiment provides that the first and second spindle assembly bodies are structurally identical and further include a bearing journal disposed adjacent to an externally threaded free end, and a collar adjacent to the bearing journal and to the internally threaded reinforcement apparatus coupling end. In this embodiment, the bearing journal, collar, externally threaded end, and internally threaded end are all formed contiguously of the same material. Also, the connector rod may be a length of heavy walled tubing cut to length and tapped at both ends and the connector rod is a solid bar or a solid rod having both ends cut, bored to a diameter and depth, and tapped. The connector rod is solid bar or a solid rod in this embodiment and the coupling interfaces to the reinforcement apparatus are separate components welded concentrically to the ends of the bar or rod, wherein the connector rod may be a bar that is square, hexagonal, or octagonal.

BRIEF DESCRIPTION OF THE SEVERAL VIEWS OF THE DRAWINGS

FIG. 5 is a side view of the internal axle housing reinforcement of FIG. 1 prior to installation within the axle tube.

FIG. 6 is a cross-sectional side view of the internal axle housing reinforcement and axial bore.

FIG. 7 is a front view of the internal axle housing reinforcement of FIG. 1.

DETAILED DESCRIPTION OF THE INVENTION

In various embodiments described in enabling detail herein, the inventor provides a unique method and apparatus for reinforcing a trailer axle with an axle spindle that is easily removed, repaired, and or replaced. The present invention is described using the following examples, which may describe more than one relevant embodiment falling within the scope of the invention.

It is a goal of the present invention to provide a mechanical means of reinforcement of a trailer axle at least in the vicinity of an installed spindle assembly. It is a further goal of the invention to provide a spindle for a trailer axle that is easily removed and replaced. It is a further goal of the invention to provide an integrated design and mechanical means to integrate a trailer axle and spindle assembly that applies to any size (length, diameter) of standard trailer axle.

Figure 1:
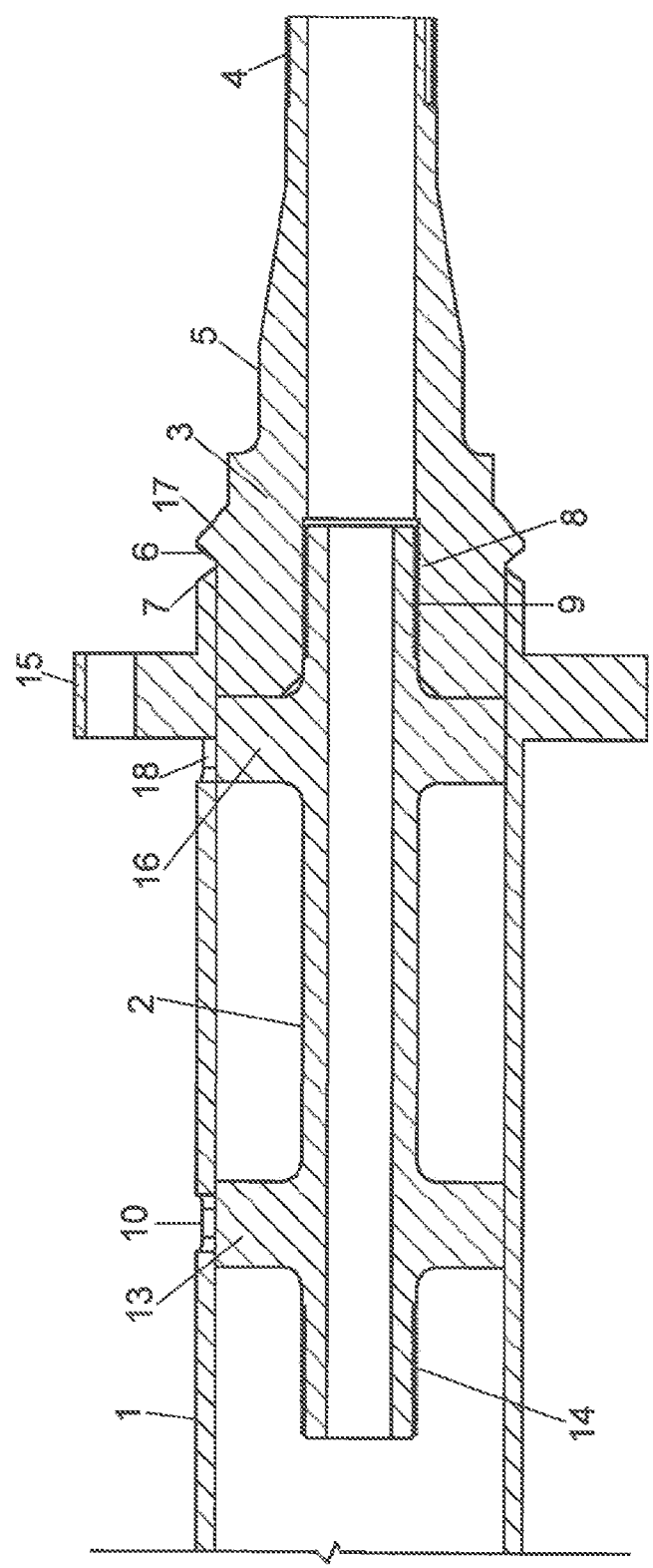
FIG. 1 is a cross-sectional side view of an internal axle housing reinforcement and a replacement spindle in position relative to an axle tube.

Referring now to the drawings, in FIG. 1, an axle tube 1 is depicted in cross-section. Axle tube 1 may be reinforced internally in this embodiment with respect to the internal diameter thereof with an internal axle housing reinforcement apparatus 2 coupled to a replacement spindle assembly 3, also depicted in cross-section. Internal housing reinforcement apparatus 2 may be referred to in this specification as axle tube reinforcement apparatus 2. A complete axle assembly may therefore include axle tube reinforcement apparatus 2 coupled to spindle assembly 3 fixed to axle tube 1.

Axle reinforcement 2 may include external threading 9 extending from one end of the reinforcement apparatus interfacing with spindle body 3 back to a collar feature 16. In this embodiment, axle reinforcement apparatus 2 includes a like arrangement at the end of the reinforcement apparatus opposite spindle body 3. More particularly external threads 14 are provided extending from the end of axle reinforcement 2 back to a collar feature 13. Reinforcement apparatus 2 may include, in one aspect, a longitudinal through bore placed at center. In one implementation, no through bore is provided or required and the center of axle reinforcement 2 may be instead solid without departing from the spirit and scope of the present invention.

Axle reinforcement 2 may be cylindrical in form or more specifically tubular with, in one embodiment, an axial longitudinal bore placed there through at longitudinal center. The external threads 9 and 14 on the ends of the internal housing reinforcement 2 may extend internally up to tube reinforcement collars 10 and 16 opposite each other and collocated on the interior side of the two threaded ends 9 and 14. The threaded ends 9 and 14 along with the reinforcement collars 10 and 16 have the option to be turned down with a lathe to have the correct and desired diameters for various installations.

Also shown in the drawings, spindle body 3 may include an externally threaded end 4 making up the free or uncoupled end of the spindle body opposite of internal threads 8. Spindle body 3 may include a bearing journal 5. The replacement spindle (spindle body 3) may be designed and fabricated to fit existing axle tube 1. Spindle body 3, like reinforcement apparatus 2, may have a longitudinal through bore placed through the center extending through from external threaded end 4 past internal threading 8.

A typical spindle does not support internal threading like internal threads 8 as depicted in FIG. 1 on spindle body 3. The symmetrical relationship between internal threads 8 and the rest of spindle body 3 may be concentric. Internal threading 8 is located opposite of externally threaded end 4 on spindle body 3. Spindle body 3 has a longitudinal through bore and machined seat supporting internal threading 8. Externally threaded end 4 may be smaller in diameter than bearing journal 5. In one embodiment, spindle body 3 has a bevel 6 cut along the interior edge of a spindle collar 17.

Figure 4:
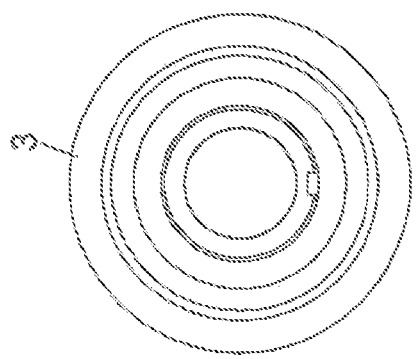
FIG. 4 is a front view of the replacement spindle assembly of FIG. 1.
Figure 2:
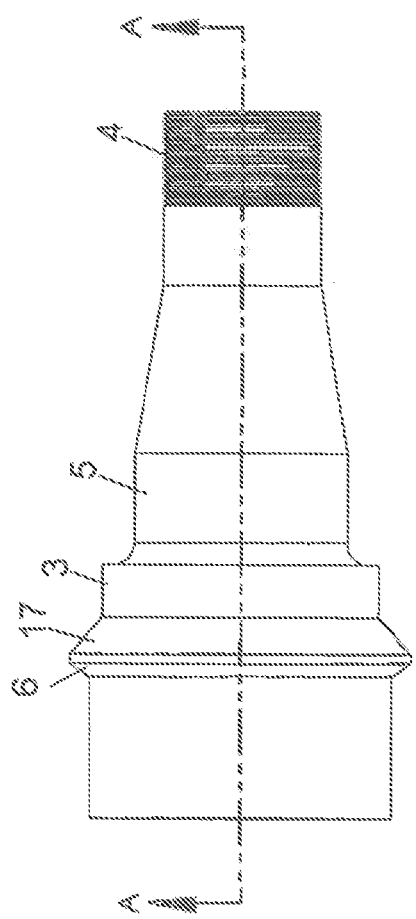
FIG. 2 is a side view of the replacement spindle of FIG. 1 in position relative to the axle tube prior to welding operations.
Figure 3:
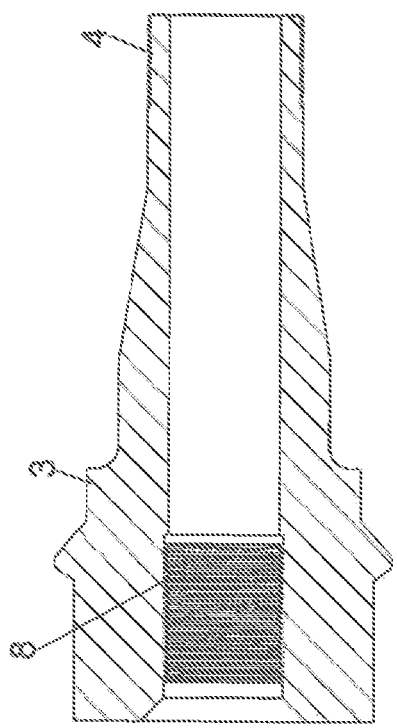
FIG. 3 is a cross-sectional side view of the replacement spindle of FIG. 1 including internal threads thereof.

Referring now to FIG. 2, replacement spindle 3 is depicted over an axle body prior to welding. Referring now to FIG. 3, replacement spindle body 3 is depicted in section view exposing internal threading 8. Referring now to FIG. 4, spindle 3 is depicted in a front view. In FIG. 5, a side view of axle reinforcement housing apparatus 2 of FIG. 1 showing external threading 14 and 9 and reinforcement collars 13 and 16. FIG. 6 is a section view of reinforcement apparatus 2 taken along section lines AA. FIG. 7 is a front-end view of housing reinforcement apparatus 2.

Figure 12:
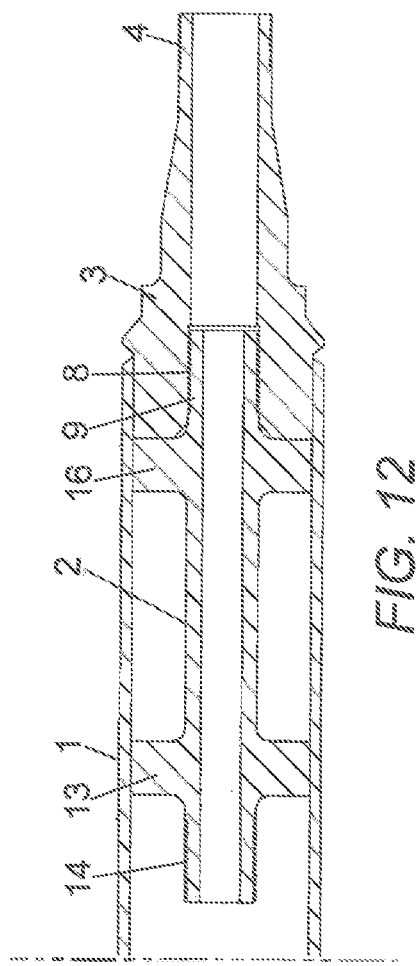
FIG. 12 is a cross-sectional side view of the replacement spindle of FIG. 1 in place on the internal housing reinforcement of FIG. 1 and the axle tube of FIG. 1 prior to welding.

A method for installing internal housing reinforcement apparatus 2 into axle tube 1 can be inferred from FIG. 1 and FIG. 12. First, the existing spindle on axle tube 1 may be cut from the axle tube, creating a surface for placement of a bevel 7 around the external edge of the axle tube after the existing spindle is cut away. Axle tube 1 may be faced (lathe) and beveled producing bevel 7 after the removal of the existing spindle.

In preparation for spindle replacement, six openings labeled openings 10 and openings 18 (three holes each) are provided through axle tube 1 (housing) at the respective center line locations of collar 13 (openings 10) and collar 16 (openings 18) of reinforcement apparatus 2. It is noted herein that openings 10 are spaced apart radially at zero, one hundred and twenty, and two hundred and forty degrees around axle tube 1 (housing) and that openings 18 are similarly spaced (0, 120, and 240 degrees).

The center line-to-center line distance between the openings 10 and 18, for example, at 0 degrees is substantially equal to the center line-to-center line distance between collars 13 and 16 at the correct placement position within axle tube 1. This distance may vary depending on the size of the axle tube 1 and internal housing reinforcement apparatus 2. Measurement may be required before all the openings are cut. Openings 10 and openings 18 are aligned to the same hole pattern positions relative to 0-degree, 120-degree, and 240-degree points.

Figure 15:
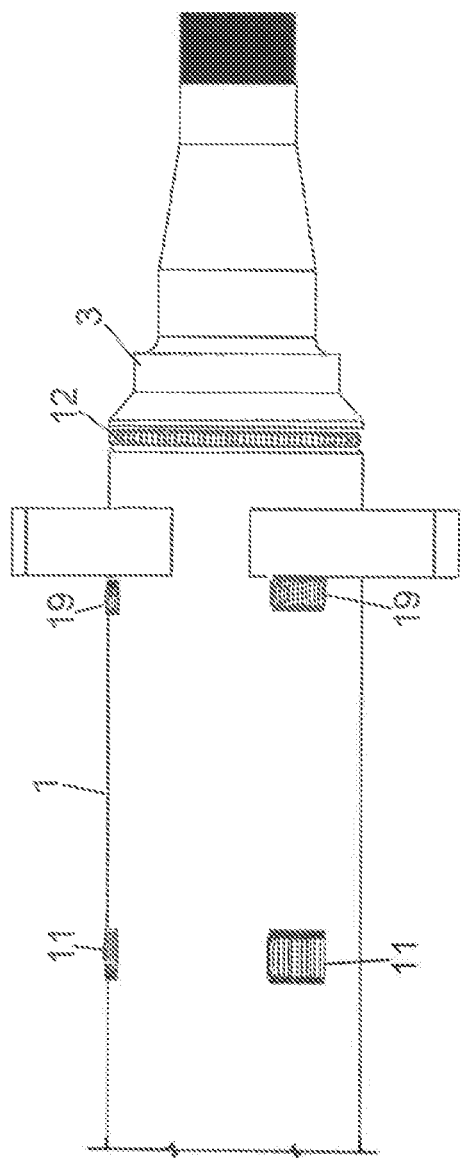
FIG. 15 is a side view of a complete spindle replacement depicting all components in place with the axle reinforcement welds and spindle axle welds.

Axle reinforcement apparatus 2 may be urged into axle tube 1 until the reinforcement collars 13 and 16 align (center-to-center) with the six manually cut holes in the two sets of openings 10 and 18. Once positioned within axle tube 1, reinforcement apparatus 2 may be welded in place as is depicted in FIG. 15 relative to welds 11 and 19. Openings 10 and openings 18 are access openings for welder tool access. Therefore, six weld points are evident, one per access opening. Welding axle tube reinforcement apparatus 2 to the inside of axle tube 1 in this implementation is intended to be a permanent reinforcement of the axle tube that requires no further maintenance or repair.

Figure 10:
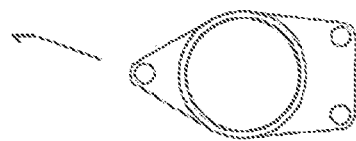
FIG. 10 is a front view of the axle tube of FIG. 1.
Figure 8:
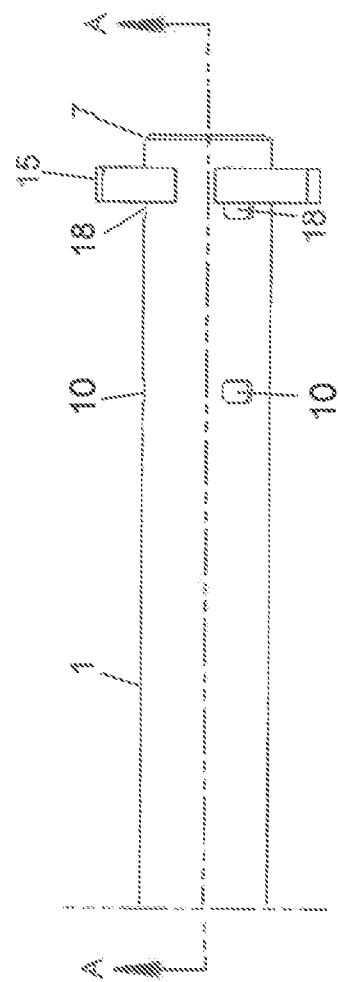
FIG. 8 is a side view of the axle tube and open weld points for placement of the internal housing reinforcement of FIG. 1.
Figure 9:
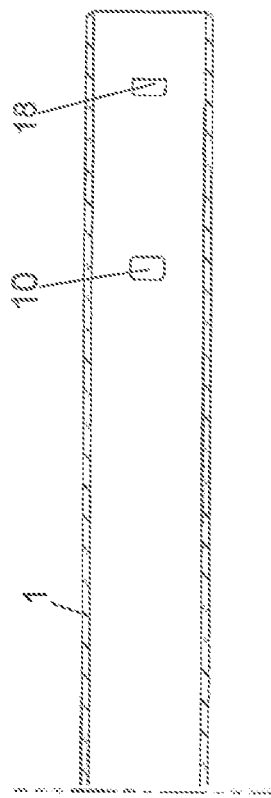
FIG. 9 is a cross-sectional side view of the axle tube of FIG. 1 and open weld points for placement of the internal housing reinforcement of FIG. 1.

In FIG. 8, axle tube 1 is depicted inside view showing open weld points 10 and 18 for accepting the axle housing reinforcement apparatus 2. FIG. 9 is a sectioned view of axle tube one taken along the section lines AA showing weld points 10 and 18 and feet 15. FIG. 10 is a front-end view of axle tube 1.

After reinforcement apparatus 2 is in place and the axle tube is beveled resulting in bevel 7, the new spindle body 3 may be threaded onto the reinforcement apparatus 2 via matching threads, more particularly, external threads 9 at the coupling end of the reinforcement apparatus, and internal threads 8 at the coupling end of the spindle body. The length of the matching thread pattern allows the user to thread spindle body up to a point where the beveled axle tube end 7 is substantially flush with the beveled end (bevel 6) of spindle body 3.

Figure 13:
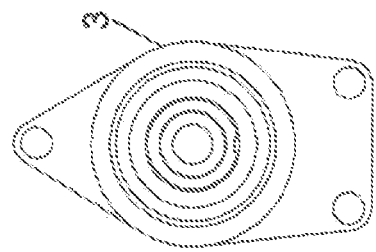
FIG. 13 is a front view of the replacement spindle of FIG. 1 in place on the axle tube of FIG. 1.
Figure 11:
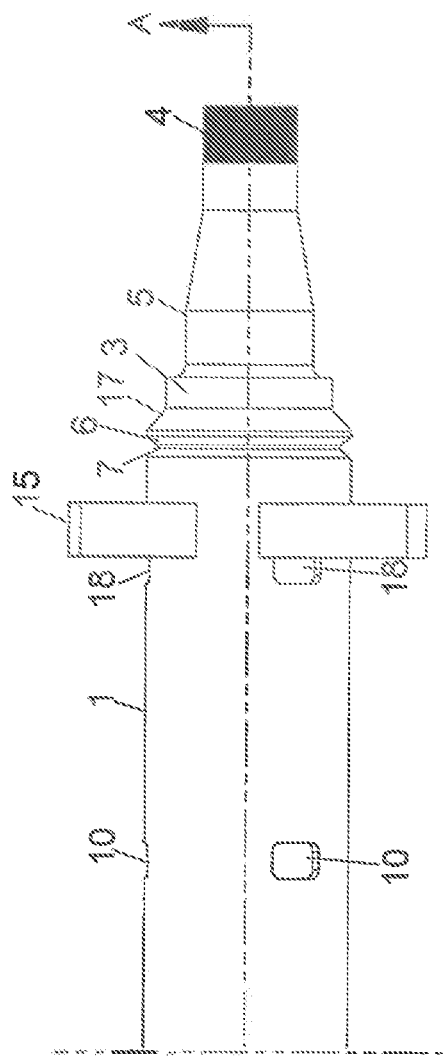
FIG. 11 is a side view of the replacement spindle of FIG. 1 in place on the axle tube of FIG. 1 prior to welding.

FIG. 11 is a side view of replacement spindle body 3 in place on axle tube 1 before welding. FIG. 12 is a sectioned view of spindle body 2 and axle tube 1 with reinforcement apparatus 2 in position before welding. FIG. 13 is a front-end view of a reinforced replaced spindle body in place on the axle tube 1. FIGS. 11 through 13 include all of the elements of FIG. 1 which have been introduced and described according to a preferred embodiment.

After spindle body 3 is threaded onto axle tube reinforcement apparatus 2 up to the proper weld point (bevels 6,7 flush), a peripheral and continuous axle reinforcement weld 12 as depicted in FIG. 15 may be applied around the welding seam within the gap space produced by the bevels. A pair of feet 15 are also provided proximal to the spindle end of axle tube 1 and are welded onto the outside of tube 1 at approximately a 60-degree angle of separation as is depicted in FIG. 1 and in subsequent figures.

Figure 14:
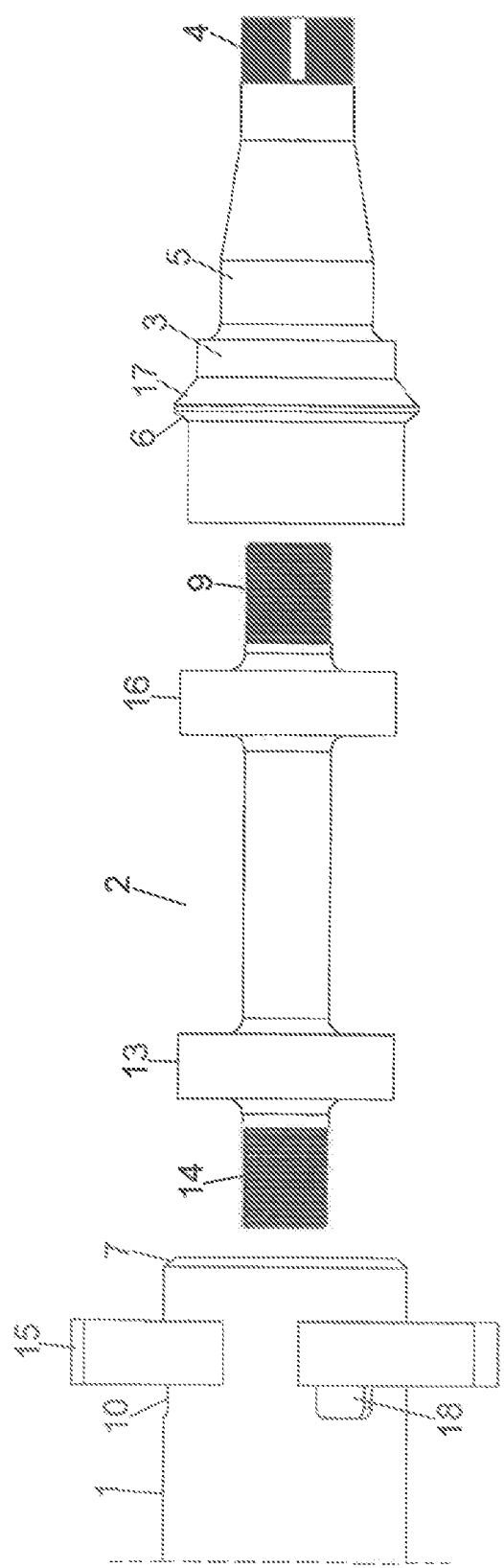
FIG. 14 is a side view of the axle tube of FIG. 1, internal housing reinforcement of FIG. 1 and replacement spindle of FIG. 1 in position before the final assembly.

FIG. 14 is an exploded view of replacement spindle 3, axle tube 1, and internal reinforcement apparatus 2 in line before assembly for welding. FIG. 15 is a side view of the reinforced replacement spindle assembly finished after weld showing filled welds 11, 19 and 12.

Spindle Removal

Spindle 3 may be subsequently removed from axle tube 1 by firstly grinding away weld 12 depicted between bevel 6 and bevel 7 in FIG. 15 and secondly unscrewing spindle body 3 from reinforcement apparatus 2. In this aspect, a new or repaired spindle body may then be threaded onto the existing internal axle tube reinforcement 2. A new axle reinforcement weld may then be applied peripherally around the axle tube within the weld gap provided by bevels 6 and 7. The method and apparatus of the invention functions to substantially extend the shelf life of an axle tube, while also substantially reducing the time and energy spent on installing a new replacement spindle.

Figure 16:
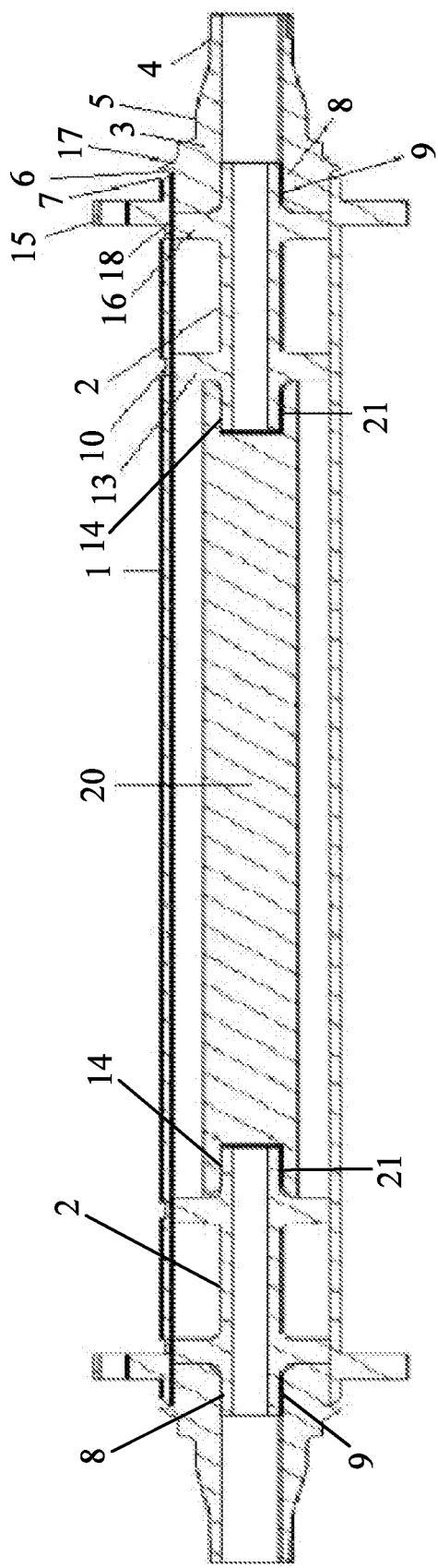
FIG. 16 is a section view of a complete axle tube reinforced assembly with a center connector rod connected between opposing internal reinforcement apparatus.

FIG. 16 is a cross section of a complete axle tube reinforced assembly with a center connector rod connected between opposing internal reinforcement apparatus. Axle tube 1 includes two identical internal reinforcement apparatuses disposed at respective spindle ends. In this embodiment, further stability may be achieved by connecting the reinforcement apparatuses together inside of the axle tube. In this embodiment, a connector rod 20 is provided. Connector rod 20 may be provided, for example, if both ends of an axle including spindle are to be repaired.

Connector rod 20 may be a heavy wall cylindrical tube having coarse female thread patterns 21 disposed at respective tubing ends that match with external thread pattern 14 provided on the internally extended ends of reinforcement apparatus 2 relative to assembled positions. In one embodiment, connector rod 20 is a solid material rod or bar as depicted herein by diagonal section lines. In this embodiment, connector rod 20 is counter-bored at each end to a specified depth and tapped to produce internal thread patterns 21 at each end.

In a preferred embodiment, reinforcement apparatuses 2 are welded into place at (proximal) ends of axle tube 1 as described relative to FIG. 9 referencing weld points 10 and 18 (two of 6 weld points for each reinforcement apparatus). The reinforcement apparatus 2 may be threaded into a respective trailer spindle 3 mating external thread pattern 9 with internal thread pattern 8 on the spindle inside the axle tube 1 and then welded in place at that (first) end of the axle tube. Connector rod 20 may then be threaded onto the reinforcement apparatus 2 friction tight mating internal thread pattern 21 on the connector rod to external thread pattern 14 in the reinforcement apparatus.

The second reinforcement apparatus 2 may then be threaded into the free end of connector rod 20 inside the axle tube 1 mating thread patterns 14 (reinforcement apparatus) and 21 (connector rod). The second reinforcement housing may be welded into place at that end of the axle tube. The second trailer spindle may then be threaded onto the end of the reinforcement (second) apparatus 2. Therefore, both axle tube reinforcement apparatuses are connected inside the axle tube by the reinforcing connection rod. In one embodiment, connecting rod 20 is a solid rod or bar with internally threaded interfaces at both ends. In one embodiment, connector rod 20 is a heavy wall tube cut to length and tapped at both ends to produce thread patterns 21.

In one embodiment of the present invention, the interfacing ends of the connector rod may be separate internally threaded caps that may be welded on concentrically to the bar stock. In one embodiment, connector rod 20 may be fabricated of a square, hexagonal, or octagonal bar stock. It should be noted herein that in replacement of a damaged axle tube, if only one reinforcement apparatus is needed then a connector rod is not required. A connector rod such as connector rod 20 is used when there are two reinforcement apparatus welded into place at respective ends of the axle tube.

It will be apparent to the skilled person that the arrangement of elements and functionality for the invention is described in different embodiments in which each is exemplary of an implementation of the invention. These exemplary descriptions do not preclude other implementations and use cases not described in detail. The Uses and methods depicted within this description are purely emblematic of definitive ways in which to build and operate this invention and are not to be understood to be limiting of scope in any way. While the uses and methods have been described with a certain degree of particularity, it is to be noted that many alterations could be made in the details of the construction and the arrangement of the apparatus and its components without departing from the spirit and scope of this invention. It is implied that the uses and methods are not limited to the examples represented in this specification for the purpose of clarification and persuasion. The invention is limited only by the breadth of the claims below.

The invention claimed is:

1. An axle tube assembly comprising:
   an axle tube having a first open end and a second open end;
   a first cylindrical tube reinforcement apparatus inserted into the axle tube from the first or second end and welded in place to the axle tube, the reinforcement apparatus including at least two cylindrical collar features oriented concentrically to the axle tube, the collar features having a uniform outside diameter just smaller than the inside diameter of the axle tube to allow frictional contact between the reinforcement apparatus outside surface and the axle tube inside surface;
   a second cylindrical tube reinforcement apparatus inserted into the axle tube from the remaining end of the axle tube and welded in place to the axle tube, the second reinforcement apparatus identical to the first reinforcement apparatus;
   a first spindle assembly removably coupled to the first tube reinforcement apparatus through the first end of the axle tube assembly;
   a second spindle assembly removably coupled to the second tube reinforcement apparatus through the remaining end of the axle tube assembly; and
   an elongated connector rod or tube connected to the first and second reinforcement apparatuses inside the axle tube and disposed between the reinforcement apparatuses;
   wherein the first and second spindle assemblies having spindle bodies welded to the cylindrical ends of the axle tube.

2. The axle tube assembly of claim 1, wherein the coupling of the spindle assemblies to the tube reinforcement apparatuses are by threaded connections mating external to internal threads between the tube reinforcement apparatus and the spindle assembly body, respectively.

3. The axle tube assembly of claim 1, wherein the tube reinforcement apparatuses are permanently welded to the axle tube at six weld points each, three of the weld points centered over one of the collar features, and three of the weld point centered over another of the collar features, the weld points spaced 120 degrees apart radially, both sets of weld points aligned radially at zero, one hundred and twenty, and two hundred and forty degrees.

4. The axle tube assembly of claim 1, wherein the tube reinforcement apparatuses have a longitudinal bore placed there through, the bore breaking out at both ends of the tube reinforcement apparatuses.

5. The axle tube assembly of claim 2, wherein the tube reinforcement apparatuses have at least one cylindrical end that provides a seat for the external thread pattern that mates with an internal thread pattern on the spindle assembly body.

6. The axle tube assembly of claim 2, wherein the body of the spindle assemblies have a cylindrical end that provides a seat for the internal thread pattern.

7. The axle tube assembly of claim 1, wherein the weld joining the spindle assembly bodies to the axle tube edge is a continuous weld applied radially and within a welding gap afforded by beveling the edges of the axle tube and the spindle assembly body to form an angularly opposed welding gap exposed to the outside surfaces of the parts.

8. The axle tube assembly of claim 2, wherein both ends of the axle tube reinforcement apparatuses support the same external thread patterns.

9. The axle tube assembly of claim 2, wherein the first and second spindle assembly bodies are structurally identical and further include:
   a bearing journal disposed adjacent to an externally threaded free end;
   a collar adjacent to the bearing journal and to the internally threaded reinforcement apparatus coupling end.

10. The axle tube assembly of claim 9, wherein the bearing journal, collar, externally threaded end, and internally threaded end are all formed contiguously of the same material.

11. The axle tube assembly of claim 1, wherein the connector rod is a length of heavy walled tubing cut to length and tapped at both ends.

12. The axle tube assembly of claim 1, wherein the connector rod is a solid bar or a solid rod having both ends cut, bored to a diameter and depth, and tapped.

13. The axle tube assembly of claim 1, wherein the connector rod is solid bar or a solid rod and wherein the coupling interfaces to the reinforcement apparatuses are separate components welded concentrically to the ends of the bar or rod.

14. The axle tube assembly of claim 13, wherein the connector rod is a bar that is square, hexagonal, or octagonal.

* * * * *